Aug. 6, 1946.  W. P. MASON  2,405,227
GEOMETRICAL INSTRUMENT
Filed March 20, 1943   11 Sheets-Sheet 1

INVENTOR
*W. P. MASON*
BY
*John A. Hall*
ATTORNEY

Aug. 6, 1946.   W. P. MASON   2,405,227
GEOMETRICAL INSTRUMENT
Filed March 20, 1943   11 Sheets-Sheet 3

INVENTOR
W. P. MASON
BY
ATTORNEY

Aug. 6, 1946.   W. P. MASON   2,405,227
GEOMETRICAL INSTRUMENT
Filed March 20, 1943   11 Sheets-Sheet 7

INVENTOR
W. P. MASON
BY
ATTORNEY

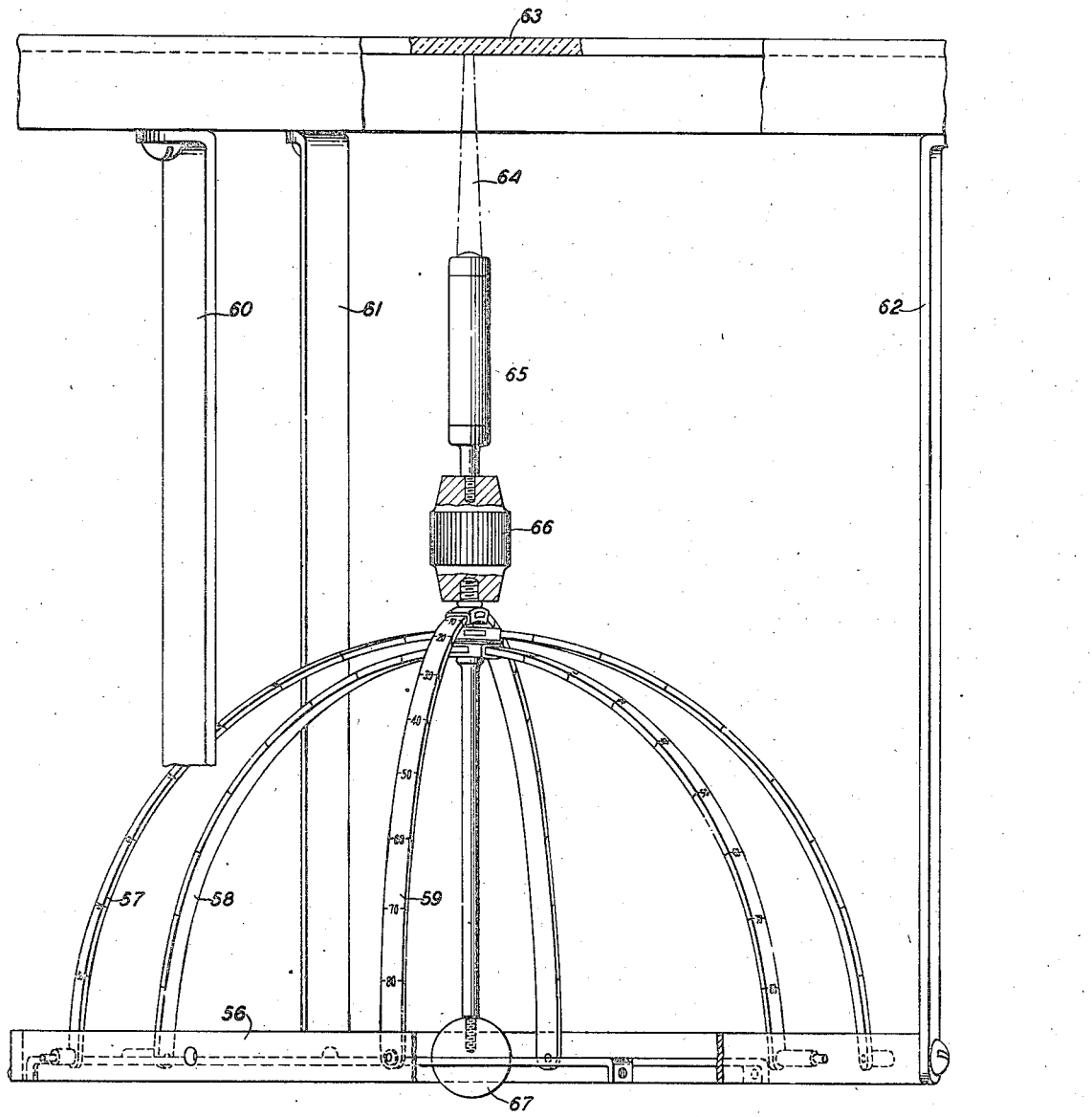

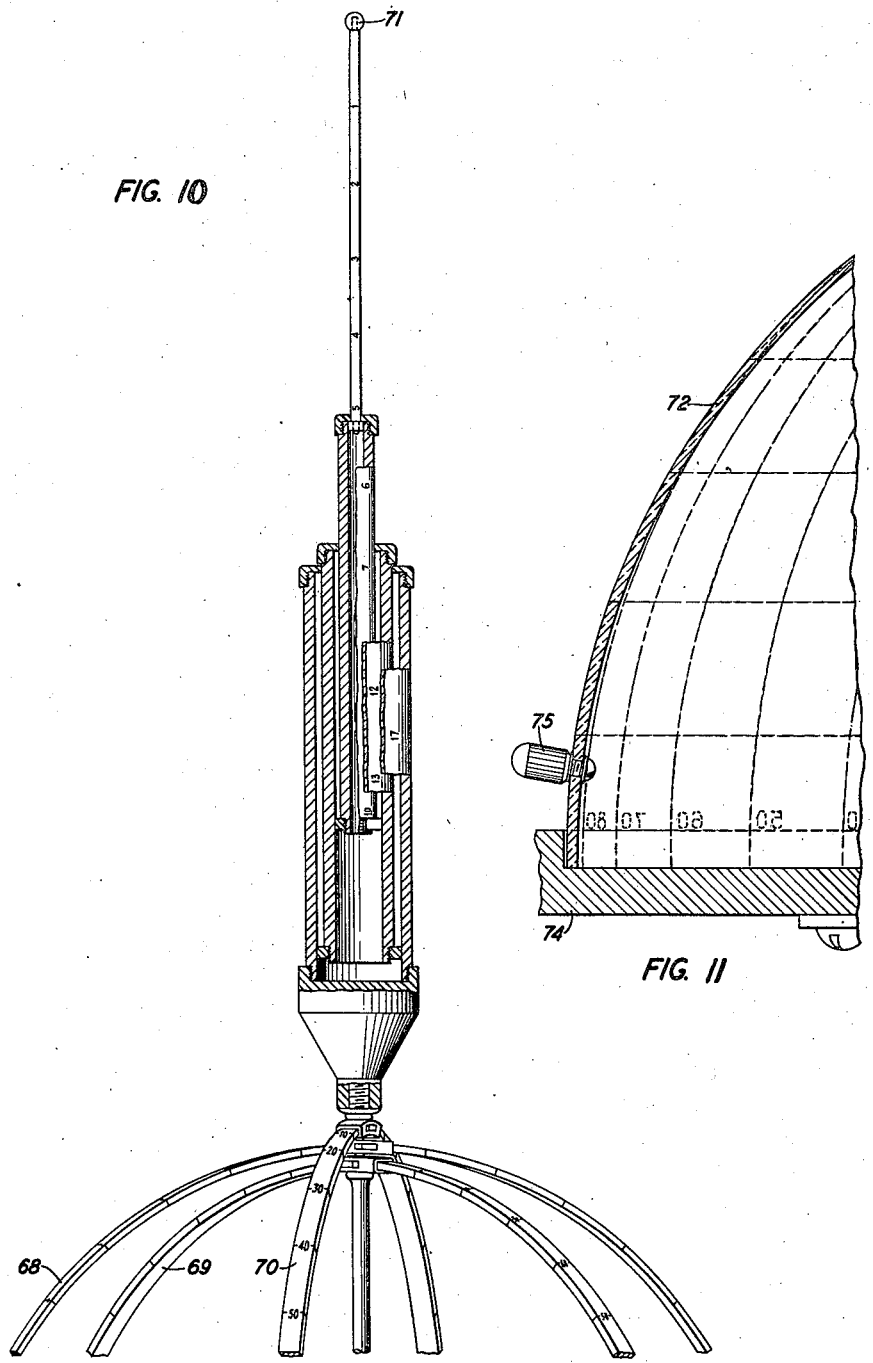

Aug. 6, 1946.     W. P. MASON     2,405,227
GEOMETRICAL INSTRUMENT
Filed March 20, 1943     11 Sheets-Sheet 11

INVENTOR
W. P. MASON
BY
*John A. Hall*
ATTORNEY

Patented Aug. 6, 1946

2,405,227

UNITED STATES PATENT OFFICE 2,405,227

GEOMETRICAL INSTRUMENT

Warren P. Mason, West Orange, N. J., assignor to Bell Telephone Laboratories, Incorporated, New York, N. Y., a corporation of New York Application March 20, 1943, Serial No. 479,886

5 Claims. (Cl. 33—1)

This invention relates to geometrical instruments and particularly to a plotting device for translating the results of readings taken from ultrasonic electrical devices into a graphical representation of the position of a detected submarine disturbance.

The object of the invention is to provide a manually operable device of simple construction which may be set in accordance with readings taken from certain electrical instruments to give without complicated calculations the required information.

In accordance with the present invention a triangular prismatic array of piezoelectric crystals is employed as a preferred method of determining the azimuth and colatitude angles of a source of vibrations such as those which come from the propeller of a ship.

By reference to my copending applications, (1) "Pipe antennas and prisms," Serial No. 381,236, filed March 1, 1941; (2) "Prismatic and high power compressional wave radiators and receivers," Serial No. 431,558, filed February 19, 1942, an understanding may be had of means whereby the angle of approach of incoming compressional waves may be determined.

In accordance with the present invention, a geometrical instrument is provided having three movable semicircular bails each pivoted at its two extremities and having a control carriage movable along its length. These bails are then pivoted on lines parallel to the longitudinal axes of the crystal array receiver. The carriage on each bail may then be moved in accordance with the angle of approach indicated by the corresponding crystal array and when so adjusted the common intersection thereof will define a straight line pointing to a spot on a surface parallel to the plane of the pivots of said bails which will fix the azimuth and colatitude angles of the detected disturbance.

Further in accordance with the present invention the three bails may be joined by appropriate mechanical means to a spoke carrying a source of light and a lens so that the movement of the three bails will cause a spot of light to be directed to a plotting surface and thus visually indicate the position of the source of disturbance.

For greater facility in handling, the plotting or charting surface may be spaced parallel to but some distance from the said plane of the pivots, in which case the field may be somewhat magnified. For the greatest convenience the charting surface may be separated from the center point of the spherical surface in which said bails move by an amount proportional to the depth beneath the surface of the sea at which the triangular receiving device is set so that if a surface vessel is detected its exact position on the surface of the water may be depicted.

Where the detected vessel is submerged then its direction from the test point may be determined but its exact whereabouts on such line will not be known unless its distance from the test point is also measured by some ranging device. In this case the azimuth and colatitude angles and the distance from the test point being known its exact three dimensional position will be fixed.

It will be recognized that with the triangular prism detecting device any two legs are sufficient to fix the direction of a disturbance and that likewise the corresponding adjustment of two bails will suffice. However, the greatest accuracy is obtained when the angle of approach of the compressional waves is nearest to a line normal to the longitudinal axis of the prism array. Hence when the angle of approach is at an extreme angle for any one of the three prism arrays, the reading of the other two will be preferred. Likewise the adjustment of the corresponding two bails will be preferred, the third being used merely as a rough check.

Further in accordance with the present invention the geometrical instrument may be mounted in an adjustable manner so that the position of the spoke may be moved away from or toward the surface on which the azimuth and colatitude angles are to be depicted whereby an adjustment to the corresponding depth of the triangular prism may be made.

In accordance with one feature of the invention the geometrical instrument may be mounted in such a manner that it may be placed on a flat table surface whereupon the spoke will point generally downwardly, the reverse of the corresponding positions of the prism array and the surface of the sea.

In accordance with an alternative arrangement the geometrical instrument may be suspended beneath a translucent or transparent table-like surface so that observers looking down on such surface would have the illusion of looking down upon the surface of the sea, the instrument then being in the same relative position as the triangular prism is to the surface of the sea.

Another feature is a telescopic arrangement of the spoke whereby its end may be moved a distance corresponding to the distance of the disturbance as determined by ranging equipment so that the extreme end of the spoke could be made to represent the point in space corresponding to the position of the detected disturbance.

Other features will appear hereinafter.

The drawings consist of eleven sheets having twelve figures, as follows:

Fig. 8 also indicates how a map based on the conventional coordinate system may be used so that a direct translation of the readings of the detecting device into latitude and longitude bearings may be made;

Fig. 9 is a side view of an alternative form of the geometrical instrument in which the bails are mounted beneath a table top constructed of transparent or translucent material so that a clear view of a map inscribed or placed thereon may be had from above;

Fig. 10 is a fragmentary side view partly in section showing a telescopic device attached to the movable indicator of the said geometrical device whereby the distance of the source of disturbance from the detecting device as well as the azimuth and colatitude angles may be indicated;

Figure 12:
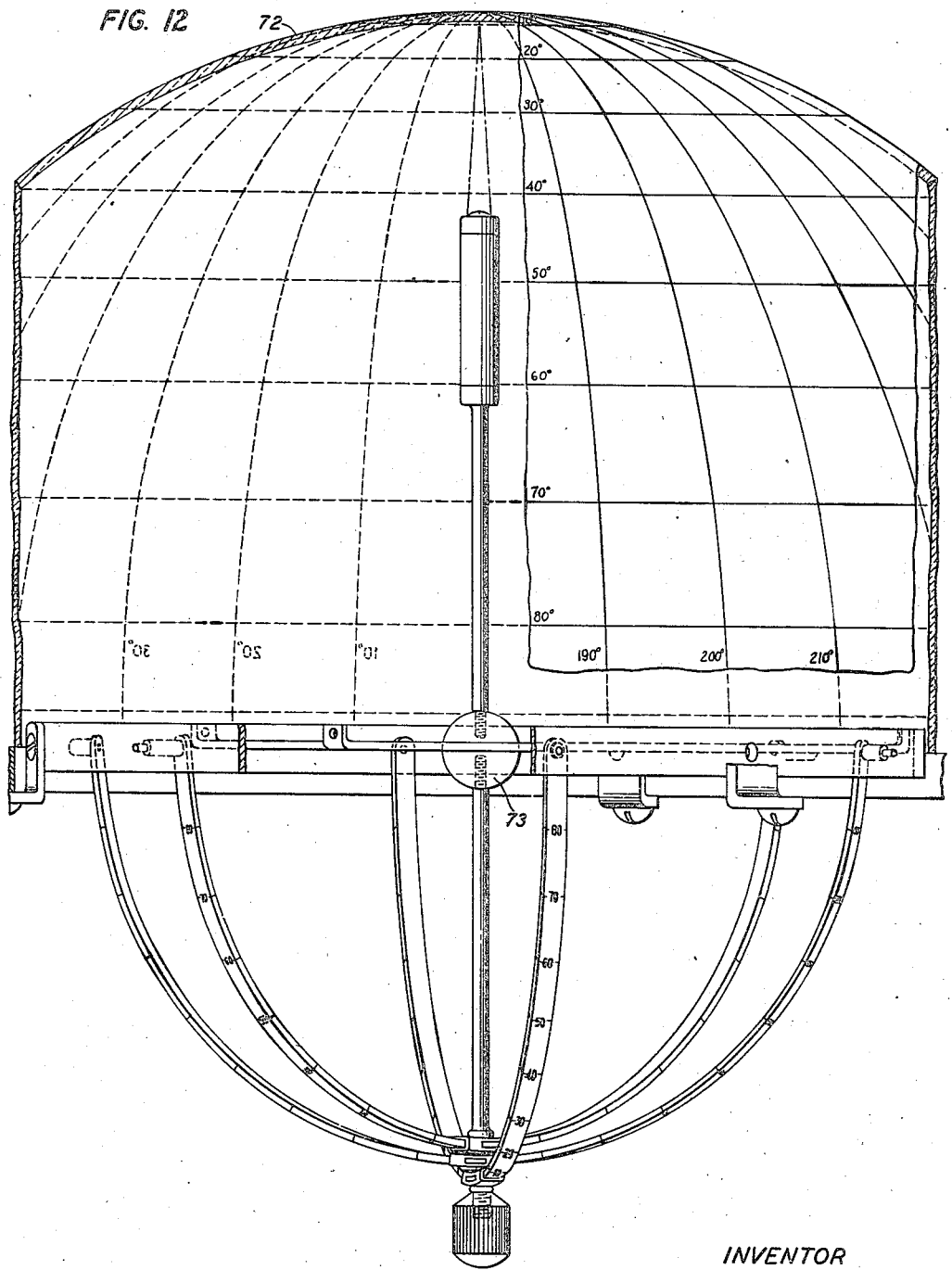

Fig. 11 is a fragmentary view of a hemispherical shell of transparent or translucent material which may be placed over the geometrical device of Fig. 9 in the manner indicated in Fig. 12. This figure shows how the hemispherical shell may be supported and how it may be moved about its axis for purposes of orientation; and Fig. 12 shows a fragmentary side view of a geometrical instrument with the bails hung downwardly and a hemispherical shell of transparent or translucent material placed axially above so that the indication may be viewed as though the observer were looking at the top half of a globe.

Figure 1:
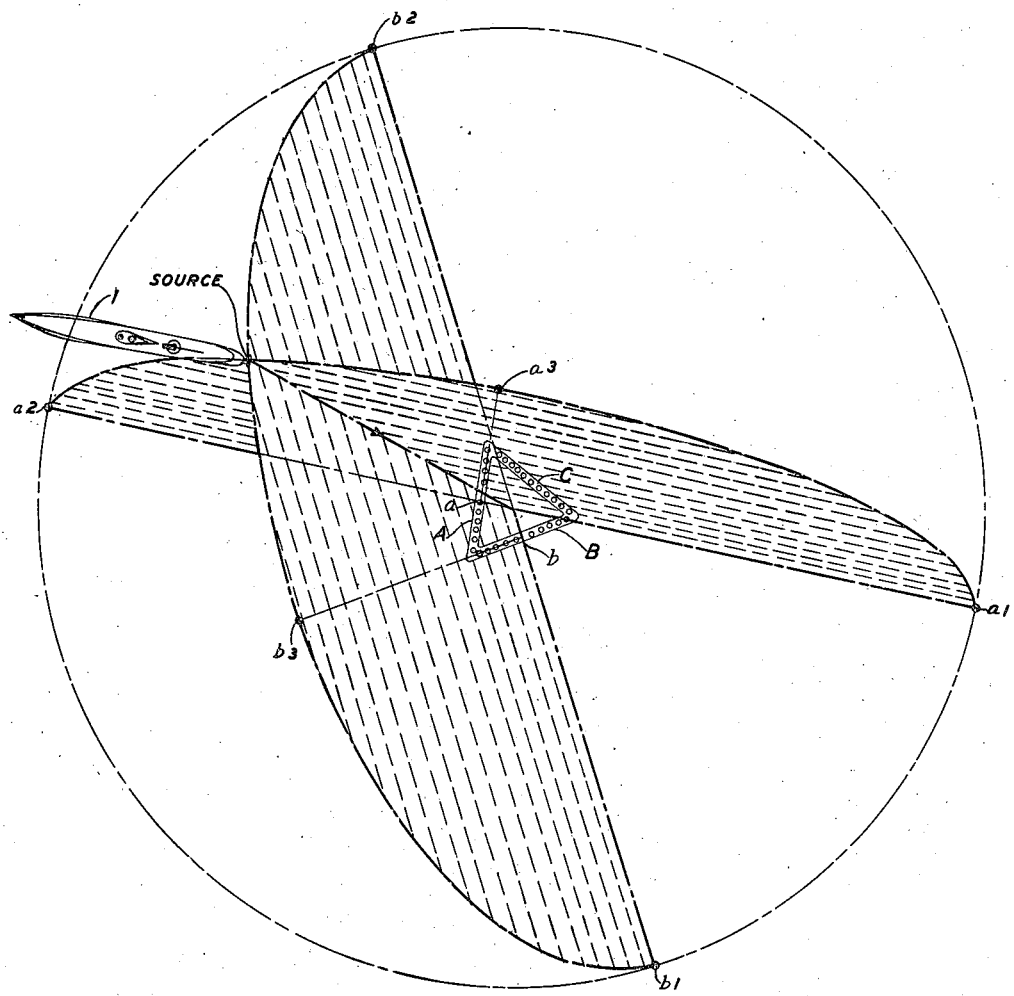
Fig. 1 is a geometrical diagram, being a plan of the intersection of two planes which are indicated in perspective and showing the line formed by the intersection thereof running from a detecting instrument to a source of disturbance.

In Fig. 1 a vessel I is shown whose propeller is a source of disturbance. Located at some distance therefrom is a triangular prism having the three legs A, B and C. This prism will be located in a horizontal position on the bed of the sea and the vessel will be located above it, either on the surface of the sea or submerged. The problem is to determine the azimuth and colatitude angles of the line extending from the theoretical center of the triangular prism to the source of disturbance and this may be done by calculating the intersection of at least two planes experimentally fixed by the electrical response of the different legs of the prism.

For purposes of illustration, the center of the prism is used as a center point of a hemisphere, somewhere in whose surface lies the source of disturbance. The circle shown by the dot and dash line is the horizontal trace of the hemisphere in whose plane the triangular prism is located. Two planes, one determined by the leg A and one determined by the leg B are defined each by a diameter of the said circle and by the great circle trace of the plane as it cuts the hemispherical surface. The plane determined by the leg A is shown by the shaded surface within the area defined by the horizontal surface straight line $a2, a, a1$, which is normal to the longitudinal axis of the leg A, and the great circle trace $a2, a3, a1$, which passes through the source of disturbance. Likewise, the plane determined by the leg B is shown by the shaded surface within the area defined by the horizontal surface straight line $b2, b, b1$, which is normal to the longitudinal axis of the leg B, and the great circle trace $b2, b3, b1$, which also passes through the source of disturbance. The intersection of these two planes is a straight line extending from the source of disturbance to the center of the prism.

Figure 2:
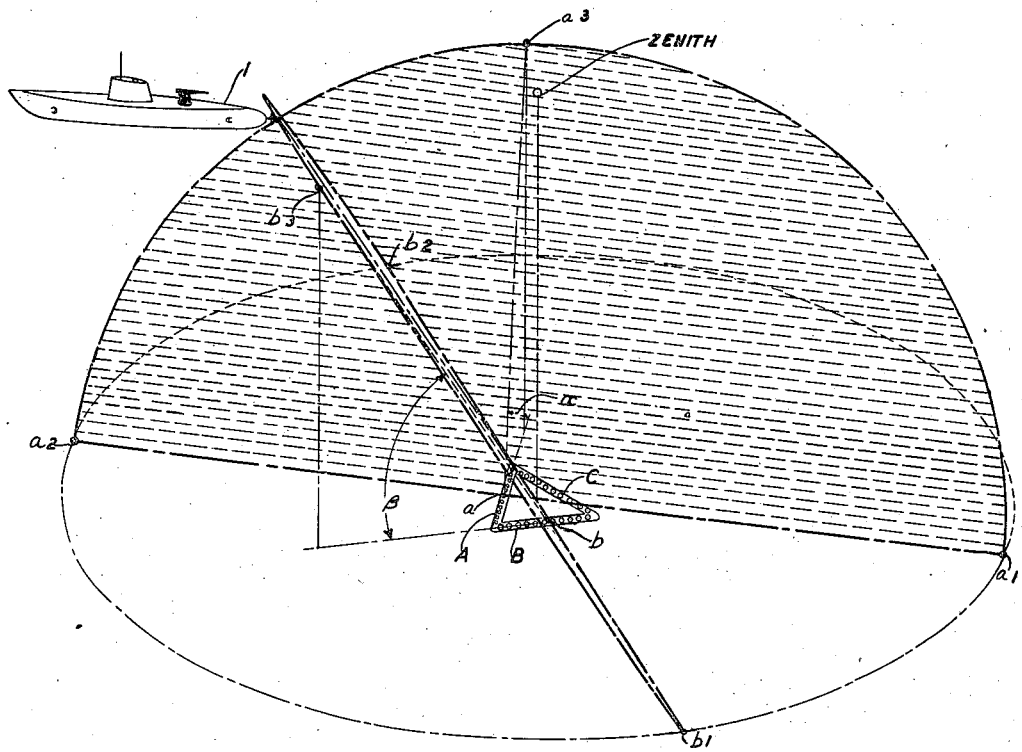
Fig. 2 is a perspective view of the same.

The plane determined by the leg A may be said to be determined by two straight lines, one the line $a2, a, a1$, lying in a horizontal plane and at right angles to the longitudinal axis of the leg A, and another $a, a3$, at right angles to the first line but at a measurable angle to the horizontal plane. This is known as the angle of approach and is that angle which the leg A will measure in accordance with the principles set forth in my copending applications, heretofore mentioned. This angle, shown as angle $\alpha$ may be visualized more clearly in perspective of Fig. 2. The corresponding angle $\beta$ defining the plane determined by the leg B may be even more clearly seen in Fig. 2.

Thus by electrical measurements of the frequency of the incoming waves from the source of disturbance, the angles $\alpha$ and $\beta$ may be determined and these determine the planes whose intersection is the straight line between the center of the triangular prism and the source of disturbance.

A third angle $\lambda$ may be determined by the leg C and may be used as a check. Practically the three angles are all measured and those two which are closest to ninety degrees are selected for use since the greatest accuracy is attained when the incoming wave is in a plane normal to the longitudinal axis of the prism.

Figure 3:
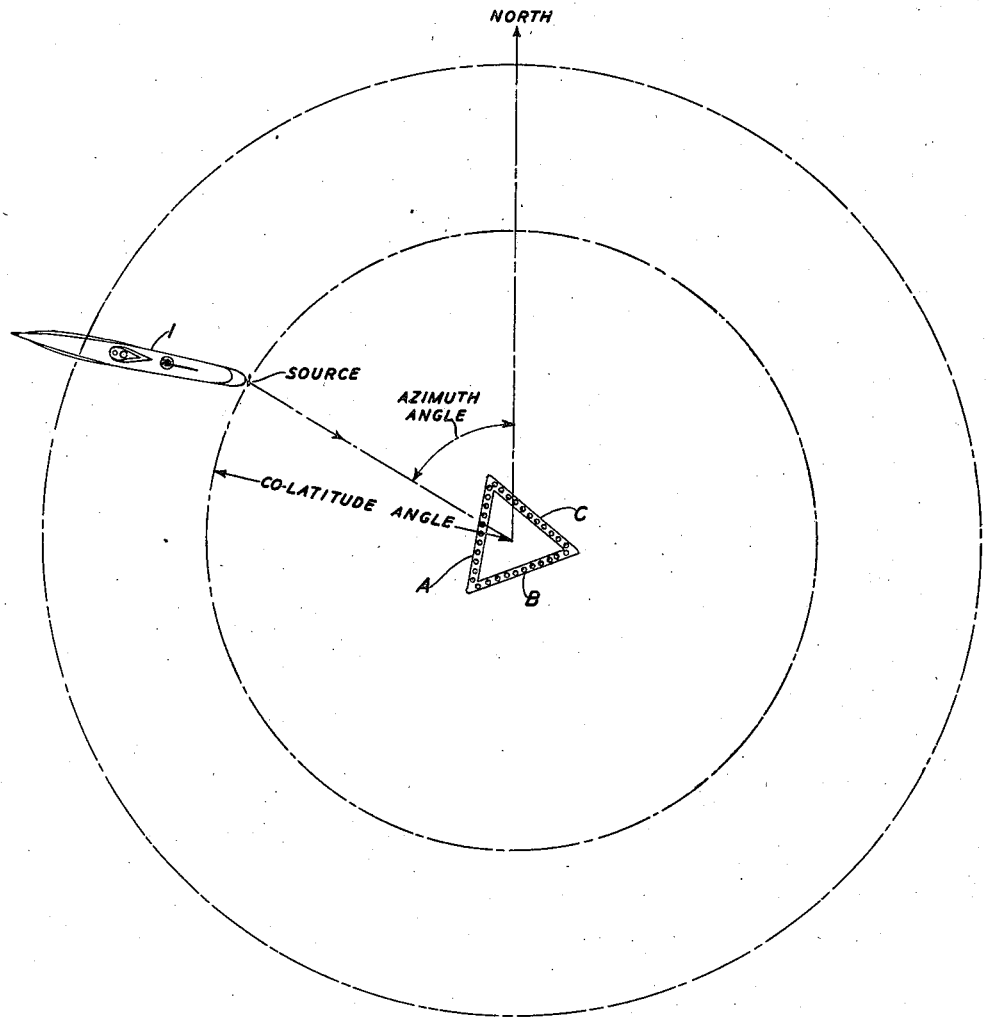
Fig. 3 is another geometrical figure, being a plan of the angles determined by the line from the detecting instrument to the source of disturbance.
Figure 4:
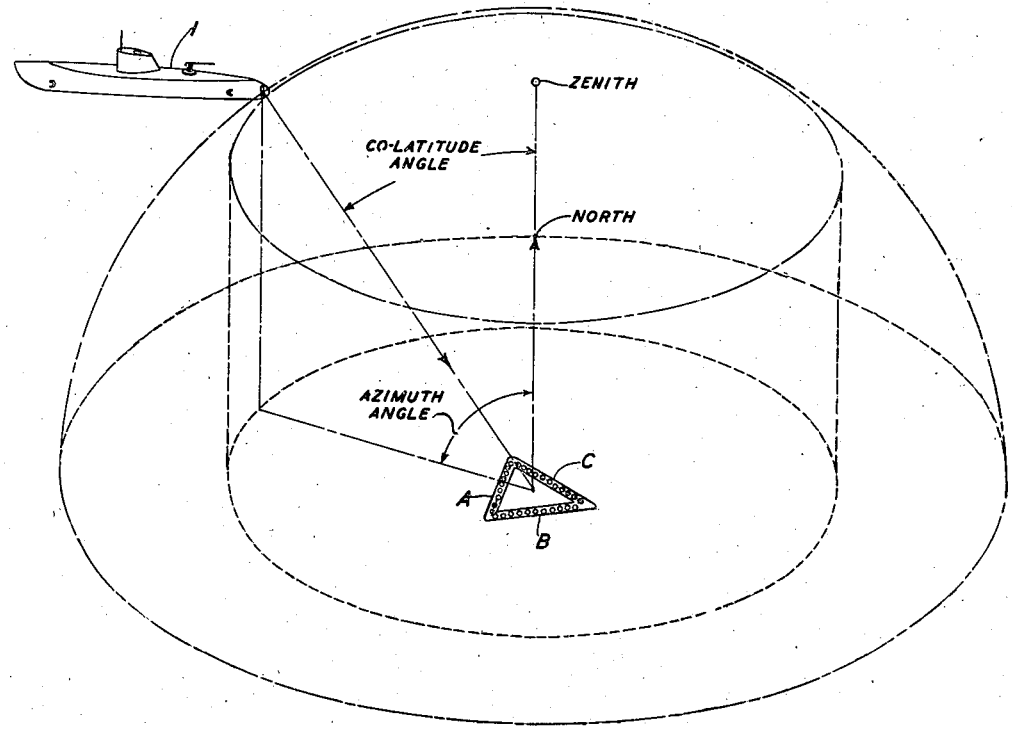
Fig. 4 is a perspective view of the same.

Now considering Figs. 3 and 4, the source of disturbance may be located by calculation. The line from the center of the prism to the source of disturbance being known, the azimuth angle may be calculated. This as seen most clearly from Fig. 3 is the angle from a given reference line, here the line from the center of the prism due north, to the projection on the horizontal plane of the determined line from the center of the prism to the source of disturbance. The colatitude angle may also be calculated. This is the angle between a line from the center of the prism to the zenith and the determined line from the center of the prism to the source of disturbance, best illustrated in Fig. 4.

Thus by the response of the different legs of the prism, first the angles $\alpha$, $\beta$ and $\lambda$ are measured. These may be translated by calculation, through the intersection of two planes into the azimuth and colatitude angles of the source of disturbance so that by plotting methods the source of disturbances may be definitely located in reference to known objects (including the triangular prism) and landmarks.

Figure 5:
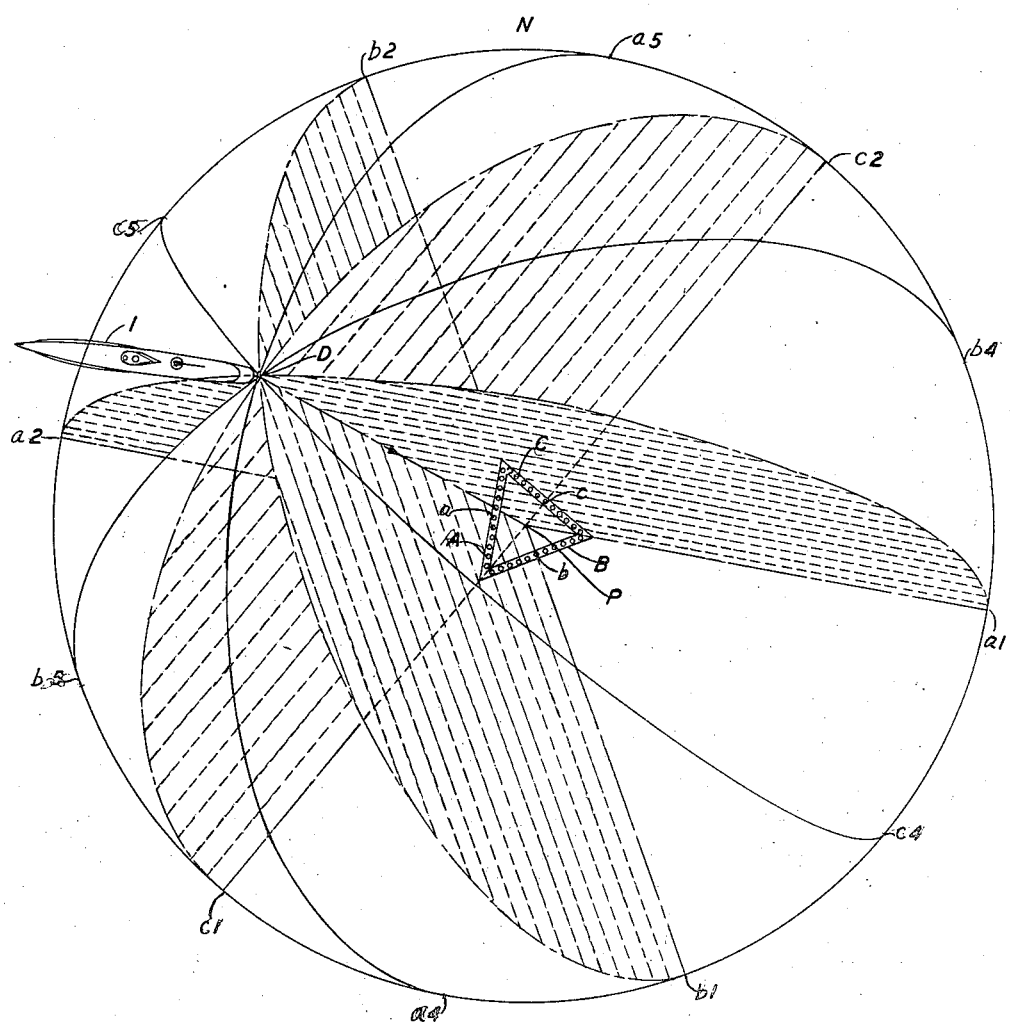
Fig. 5 is a geometrical diagram similar to Fig. 1, but showing the three planes determined by the three legs of the triangular prism and the theoretical center lines of the three corresponding bails of the geometrical instrument which is the subject-matter of the present application.

Now when a source of disturbance has been detected, it is essential that the location be made without delay and since calculation is a time consuming operation and may be subject to some error, it is desirable to make the location by mechanical means if possible. Therefore the geometrical instrument of the present invention has been devised. Fig. 5 shows the three planes that are measured by the three legs A, B and C of the triangular prism. The plane determined by the leg A may be considered as revolving about the line $a1$, $a2$, as an axis. If a bail is pivoted on a line parallel to the longitudinal axis of the leg A and passing through the theoretical center point P of the triangular prism, a point D on this bail would represent a control point for the theoretical plane. Thus if the bail which is pivoted at points $a4$ and $a5$ is calibrated or marked off in values of the angle $\alpha$ and a marker moved along the bail until it indicated the angle $\alpha$ determined by measurement of the angle of approach, a point D will be fixed as a determining factor for the position of the plane determined by the leg A.

Similarly, two other bails one for leg B and one for leg C may be provided so that if a marker interconnecting the three bails is then adjusted in accordance with the three angles $\alpha$, $\beta$ and $\lambda$ determined, the marker at point D will be at the point of disturbance. If this marker is mechanically connected to a spoke pivoted at the point P, then the longitudinal axis of the spoke will be the intersection of the three planes and will point in the desired direction.

The geometrical instrument of the present invention is built on lines based on the above theoretical considerations. Shortly, it consists of three bails pivoted on lines parallel to the longitudinal axes of the three legs of the triangular prism with an adjustable interconnecting point carrying a pointer which will point along a line between the center point of the axes of the three bails and the said interconnecting point. The mechanical construction of this instrument may take several forms as will be described in detail hereinafter.

Figure 6:
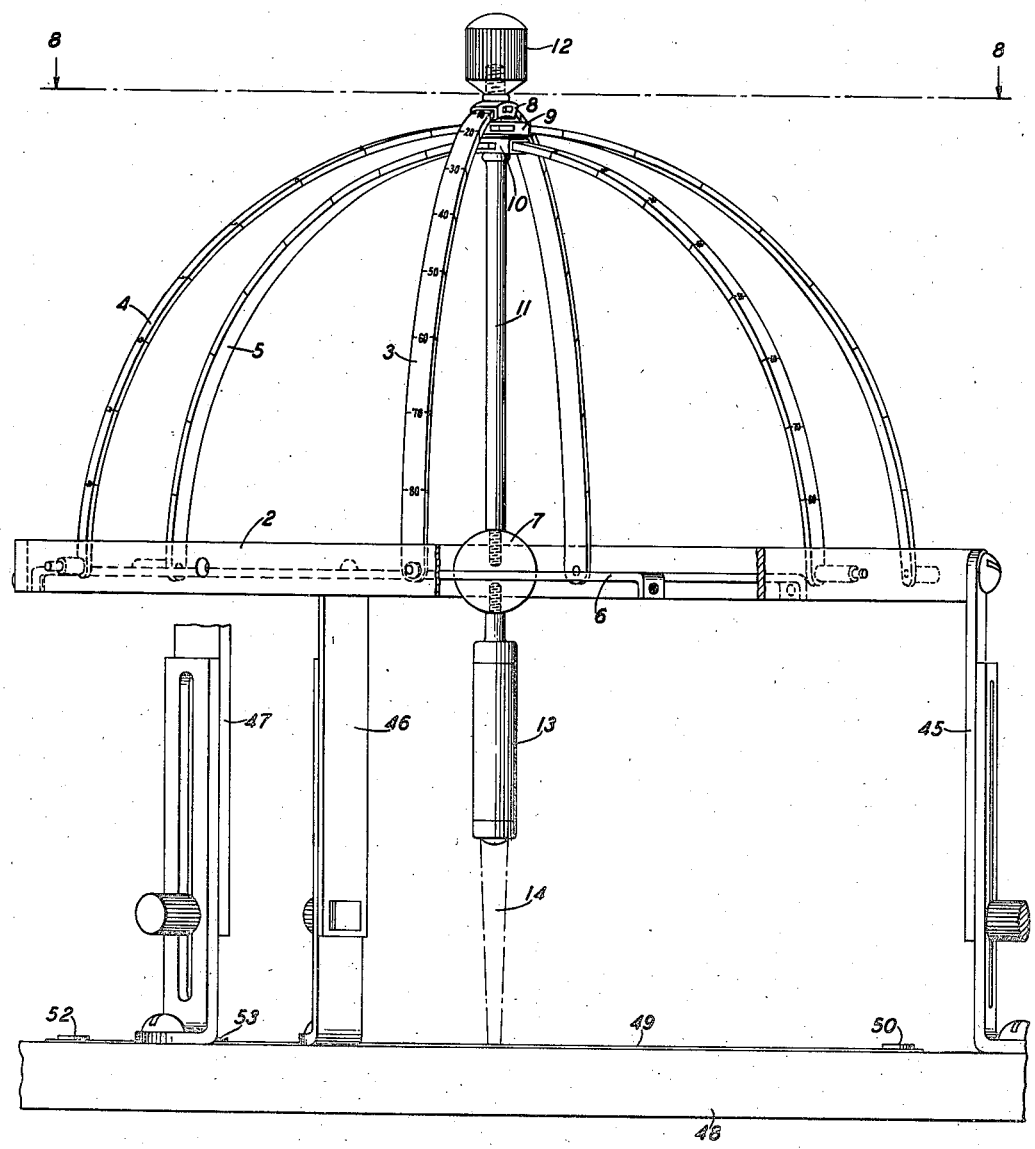
Fig. 6 is a side view of one form of the said geometrical instrument.
Figure 7:
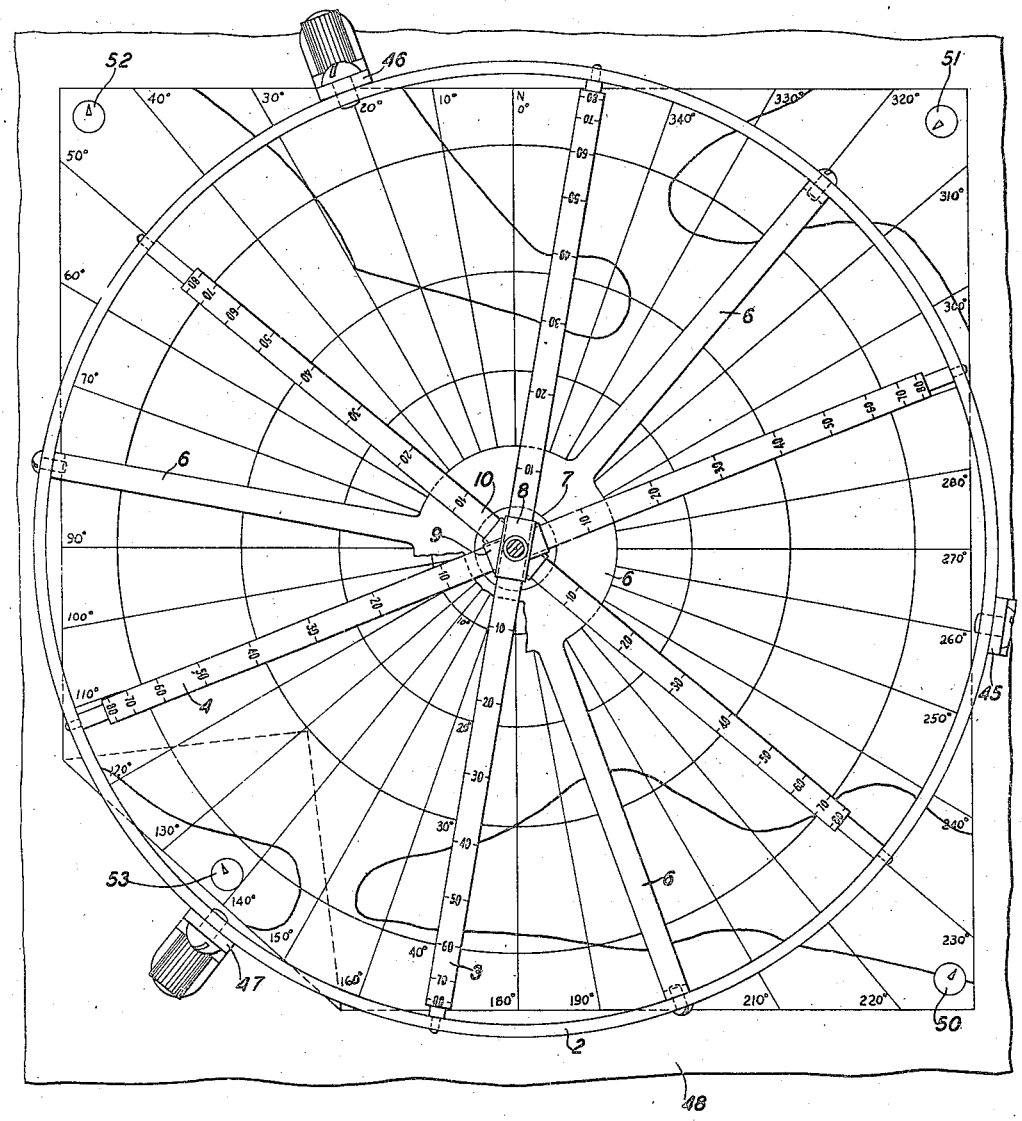
Fig. 7 is a plan view of the same, showing how a map of the locality where the detecting device is used may be mounted so that the geometrical instrument may be used to quickly translate the readings into bearings to report to the proper authorities the location of a detected source of disturbance.

One form of the geometrical instrument is shown in a side view in Fig. 6 and in a plan view in Fig. 7. It consists essentially of a base in the form of a ring 2 in which the three bails 3, 4 and 5 have their ends pivoted. A spider 6 is secured to the ring 2 and provides a bearing for the ball 7 whose center lies at the center point of each of the hemispheres described by the bails 3, 4 and 5 in their movements. Each bail has a slider such as 8, 9 and 10 and these sliders are interconnected on a center line passing through the ball 7. A spoke 11 interconnects the ball 7 and the group of sliders 8, 9 and 10. A knob 12 may be used to move the sliders along their bails until each has been set in a predetermined position and by tightening may firmly secure the instrument in any set position. An element 13 may house a battery and lamp to provide a focused beam of light 14 pointing along the longitudinal axis of the spoke 11. The element 13 is attached to the ball 7 and will therefore act as an extension of the spoke 11.

The base member 2 may be supported in any appropriate manner to hold the plane of the base 2 at a given distance above a parallel plane on whose surface a map of the locality in which the triangular prism is used may be placed. In the showing of Fig. 6, three adjustable legs 45, 46 and 47 are shown by way of example. These may be secured to a base board 48 on which a map 49 may be secured by thumb tacks 50, 51, 52 and 53, or any other appropriate means. The map 49 is shown as inscribed on a base ruled off in polar coordinates to represent the azimuth and colatitude angles hereinbefore described.

When a source of disturbance is detected and this geometrical instrument is properly adjusted the beam of light 14 will indicate a particular spot which may be reported to the proper authorities in terms of its polar coordinates and the authorities having at hand a like map will be precisely informed of the location of the source of disturbance.

The map may be moved about and adjusted to indications from known sources of disturbance for the purpose of proper orientation.

Figure 8:
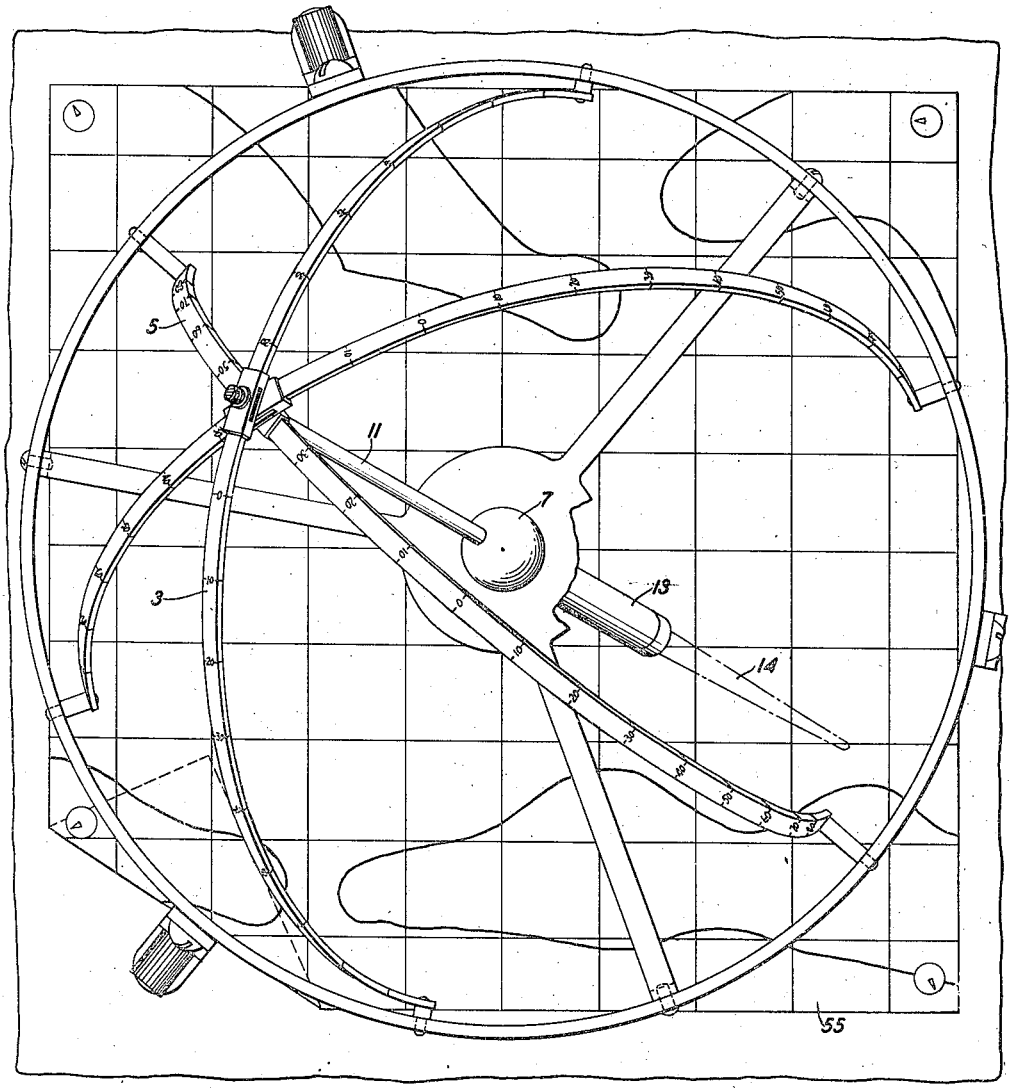
Fig. 8 is a view similar to that of Fig. 7 showing the bails moved to a position other than what might be termed dead center.

Fig. 8 is similar to Fig. 7 and is intended to more clearly illustrate the present invention by showing the bails 3, 4 and 5 moved to a position other than what might be termed dead center as in Fig. 7. This figure also shows a similar map 55 only now it is incribed on the more common lines of latitude and longitude. In this manner the geometrical instrument may be used as a means to directly translate the readings of the angles $\alpha$, $\beta$ and $\lambda$ into terms of latitude and longitude. It will be appreciated that calculation of the bearing of a source of disturbance from the readings of the angles of approach would be laborious and time consuming.

Fig. 9 shows an alternative construction in which the base ring 56 and the three bails 57, 58 and 59 are suspended by the legs 60, 61 and 62 beneath a table surface 63. This surface may be made of transparent or translucent material so that the spot of light from the beam 64 will show up on a map inscribed on the surface 63 and give an unobstructed view of the indication. In this case the light housing 65 is mounted directly on the knob 66 instead of on the ball 67.

In Fig. 10 there is shown a pointer mounted on the slider assembly associated with the three bails 68, 69 and 70 which is in the form of a telescopic arrangement. By measuring the distance between the detecting device and the source of disturbance by any well-known ranging method, the tip end 71 of the telescopic pointer may be made to represent the distance as well as the direction of the source of disturbance. It will be appreciated that the readings of the azimuth angle and the colatitude angle only definitely and exactly locate the source of disturbance when such source is on a known level as for instance the surface of the sea. If, however, the source is submerged at some depth, the exact location is uncertain. By using the telescopic device of Fig. 10 mounted on a device such as shown in Fig. 9, the depth may be indicated as well as the direction. By placing a tiny light bulb in the tip 71, the exact location with respect to a surface vessel may be indicated.

Figs. 11 and 12 show another alternative arrangement, similar in some respects to the arrangement of Fig. 9 only here the flat table top is replaced by a transparent or translucent hemispherical shell 72, all points on which are equally distant from the center of the ball 73. As shown in Fig. 11 this shell may be set into a circular aperture slightly below the level of a supporting base 74. By means of a knob 75, the shell may be rotated about its vertical axis for purposes of orientation.

What is claimed is:

1. A geometrical instrument comprising a plurality of semicircular bails pivoted at their extremities and moving in concentric hemispherical surfaces, said bails being pivoted on intersecting, angularly related lines, a spoke functioning as a pointer, a carriage movable along each bail for interconnecting said spoke and said bails whereby the angular adjustment of the said several bails will move said spoke to a position in a line from the center of said hemispherical surfaces to the common intersection of said bails, a plotting surface parallel to the plane of said pivots and a light beam carried by said spoke for defining a point on said plotting surface corresponding to the said angular adjustment of said bails.

2. A geometrical instrument comprising a plurality of semicircular bails pivoted at their extremities and describing in their movements concentric hemispherical surfaces, said bails being pivoted on intersecting, angularly related lines, a spoke functioning as a pointer, a carriage movable along each bail for interconnecting said spoke and said bails whereby the angular adjustment of the said several bails will move said spoke to a position in a line from the center of said hemispherical surfaces to the common intersection of said bails, a plotting surface parallel to the plane of said pivots, said plotting surface being at a distance from said pivot plane convenient for the play of said spoke pointer over a map or chart of given scale, and a light beam carried by said spoke for pointing out on said plotting surface a point defined by the angular setting of said bails.

3. A geometrical instrument comprising a plurality of semicircular bails pivoted at their extremities and describing in their movements concentric hemispherical surfaces, said bails being pivoted on intersecting, angularly related lines, a spoke functioning as a pointer, a carriage movable along each bail for interconnecting said spoke and said bails whereby the angular adjustment of the said several bails will move said spoke to a position in a line from the center of said hemispherical surfaces to the common intersection of said bails, a plotting surface parallel to the plane of said pivots, said plotting surface being on the same side of said pivot plane as the said bails.

4. A geometrical instrument comprising a plurality of semicircular bails pivoted at their extremities and describing in their movements concentric hemispherical surfaces, said bails being pivoted on intersecting, angularly related lines, a spoke functioning as a pointer, a carriage movable along each bail for interconnecting said spoke and said bails whereby the angular adjustment of the said several bails will move said spoke to a position in a line from the center of said hemispherical surfaces to the common intersection of said bails, a plotting surface parallel to the plane of said pivots, said plotting surface being on the same side of said pivot plane as the said bails, said spoke carrying a light beam for defining a point on said plotting surface corresponding to the said angular adjustment of said bails, said plotting surface being of translucent material whereby said defining point of light may be viewed from the opposite side of said plotting surface.

5. A geometrical instrument comprising a plurality of semicircular bails pivoted at their extremities and describing in their movements concentric hemispherical surfaces, said bails being pivoted on intersecting, angularly related lines, a spoke functioning as a pointer, a carriage movable along each bail for interconnecting said spoke and said bails whereby the angular adjustment of the said several bails will move said spoke to a position in a line from the center of said hemispherical surfaces to the common intersection of said bails, said spoke being extensible whereby a point in space may be defined by the adjustment extension of said spoke and the angular adjustment of said bails.

WARREN P. MASON.